June 8, 1937.  J. E. DUBE  2,083,438
SHAFT SEALING DEVICE
Filed Jan. 23, 1935  2 Sheets-Sheet 1
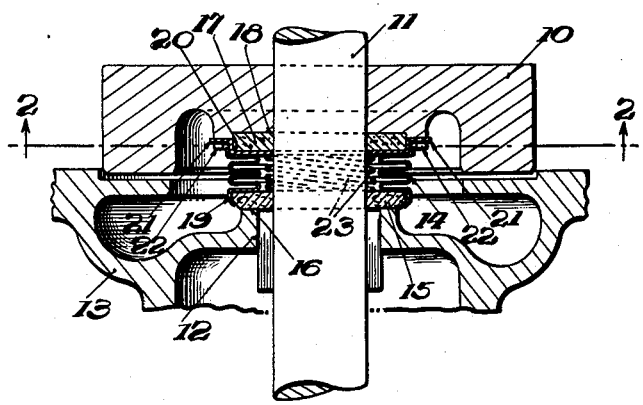
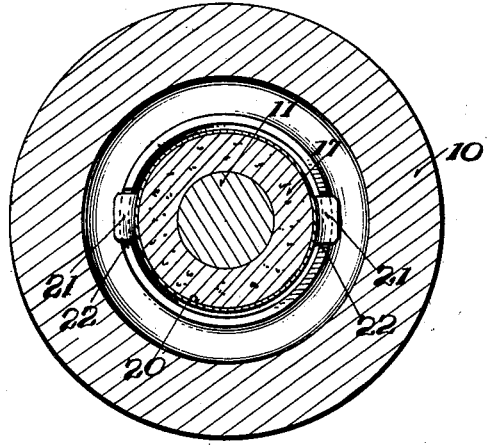
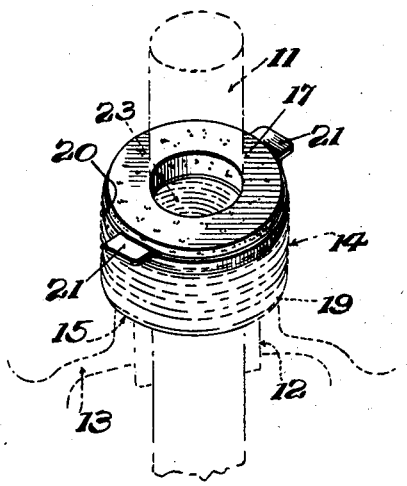
Inventor
John E. Dube
By
Cameron, Kerkam + Sutton  Attorneys June 8, 1937. J. E. DUBE 2,083,438
SHAFT SEALING DEVICE
Filed Jan. 23, 1935 2 Sheets-Sheet 2
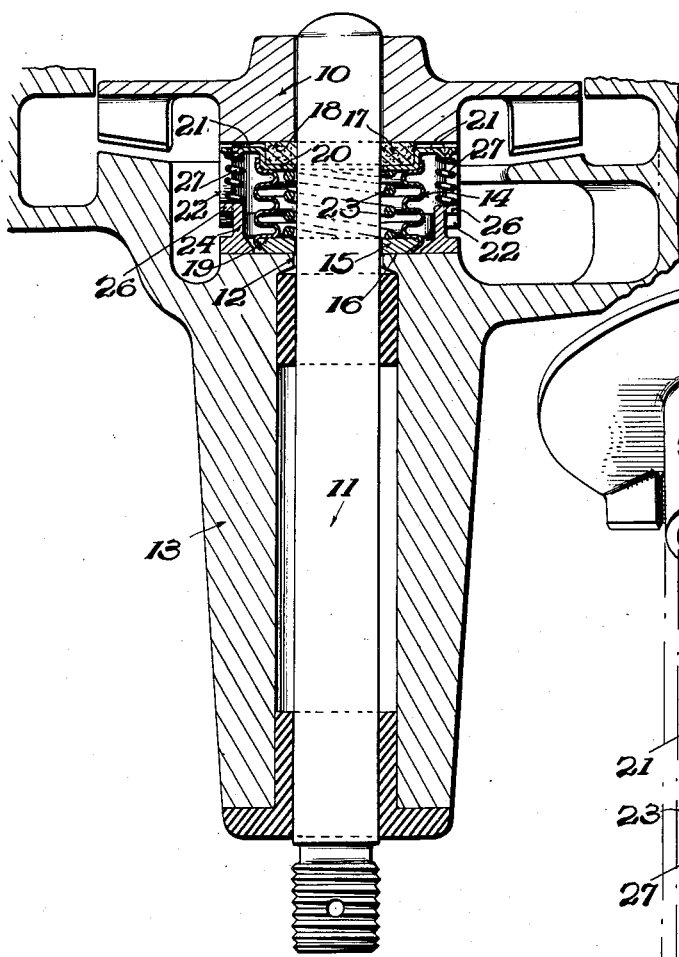
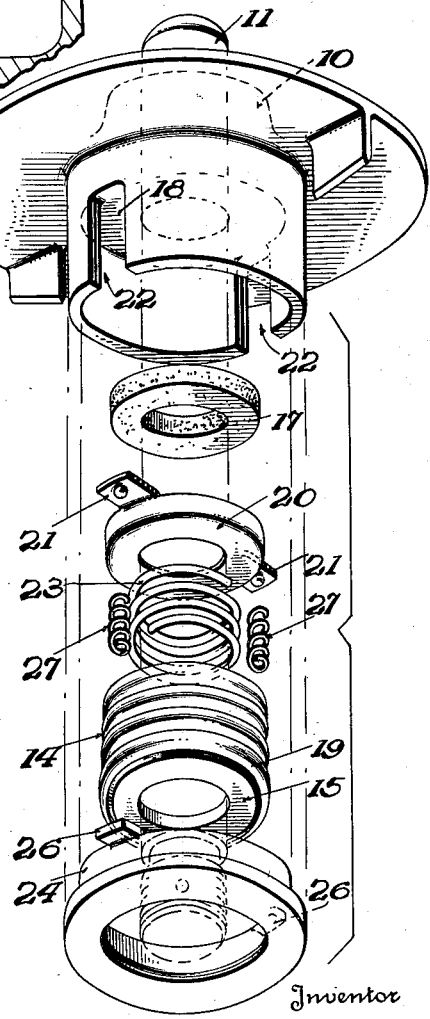
Inventor
John E. Dube.
By Cameron, Kerkam + Sutton
Attorneys Patented June 8, 1937

2,083,438

UNITED STATES PATENT OFFICE 2,083,438

SHAFT SEALING DEVICE

John E. Dube, Knoxville, Tenn., assignor to The Fulton Sylphon Company, Knoxville, Tenn., a corporation of Delaware Application January 23, 1935, Serial No. 3,111

10 Claims. (Cl. 308—36.2)

This invention relates to a shaft sealing device, and more particularly to a shaft sealing device of unitary construction employing an expansible and collapsible corrugating metal wall or bellows. The invention is capable of embodiment in sealing devices for shafts of a wide variety of mechanism, but as it possesses particular utility when employed in a seal for the shaft of a rotary pump it will be illustrated and described with reference to its application to such a pump, but it is to be expressly understood that the invention is not to be limited to such use.

It is an object of this invention to provide a seal for a rotary shaft which constitutes a self-contained unit that may be readily renewed and applied to or withdrawn from operative position in one piece without manipulation of special attaching means.

Another object of this invention is to provide a seal for a rotary shaft with simple means which may be associated therewith for taking an outward thrust on the shaft.

Another object of this invention is to provide a device of the type characterized which is simple in construction, inexpensive to manufacture and install, and highly efficient in operation.

Other objects will appear as the description of the invention proceeds.

The invention is capable of receiving a variety of mechanical expressions one of which is shown on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures—

Fig. 1 is an axial section of a rotary shaft provided with a seal embodying the present invention;

Fig. 2 is a transverse section on the line 2—2 of Fig. 1;

Fig. 3 is a perspective view of the seal with the impeller removed to show the relationship of the parts;

Fig. 4 is an axial section of an embodiment of the invention including means for taking care of an outward thrust; and Fig. 5 is an exploded view to illustrate the component parts of the structure in perspective.

In the form shown, 10 designates diagrammatically any suitable impeller mounted on a shaft 11 which extends through the aperture 12 of a casing 13. To prevent leakage through the aperture 12 a seal is provided between said impeller 10 and the casing 13 where the shaft 11 passes through said aperture.

In conformity with the present invention the seal takes the form of a unitary structure which may be applied to and removed from the shaft 11 without manipulation of any attaching means, said sealing unit being composed of an expansible and collapsible corrugated metallic wall or bellows which carries sealing rings at its opposite extremities and is provided with means for cooperation with the impeller to insure rotation therewith, said bellows also preferably containing resilient means to assure proper sealing contact between the sealing rings carried thereby and the opposed surfaces with which said sealing rings engage.

The expansible and collapsible corrugated metal wall or bellows 14 may be of any suitable material, diameter, length, number and shape of corrugations, etc., and it carries, suitably attached thereto, a sealing ring 15 for engagement with an opposed surface 16 which surrounds the aperture 12 and a second sealing ring 17 for engagement with the face 18 of the impeller 10. The ring 15 as shown may be attached to the bellows 14 by spinning over the end of the bellows so as to embrace the periphery of the sealing ring as clearly illustrated at 19 in Figs. 1 and 4. Inasmuch as this sealing ring has relative rotary movement with respect to the opposed face 16 it is preferably made of a bearing material which minimizes friction and is resistant to undue wear. While any suitable material may be employed to this end a textile base of phenolic resin compound has been found to be suitable. The ring 17 may be made of softer and more yielding material inasmuch as there is no relative rotary movement between the same and the opposed face 18. While any suitable material may be employed a soft resilient material such as cork or felt has been found to be preferable, and said ring may be secured to the end of the bellows by cementing or pressing the same into a cup-shaped member 20 suitably attached as by soldering to the end of said bellows.

To assure that the sealing unit shall rotate with the impeller 10 and at the same time to avoid the need for special attaching means, the end of the unit which is contiguous to the impeller 10 may be provided with one or more suitable projections for engagement with suitable projections or in suitable depressions in the impeller. As shown, the member 20 is provided with a pair of integral tabs 21 which may be engaged in correspondingly sized and arranged notches 22 provided in the face of the impeller 10, but it is to be expressly understood that any other suitable means for interlocking the impeller and the end of the bellows may be provided if preferred.

In order to assure that the sealing rings 15 and 17 are at all times maintained in firm sealing contact with their opposed faces 16 and 18 respectively, resilient means are preferably provided to supplement the normal resilient action of the bellows wall, and while these resilient means may be provided in a variety of ways the preferable construction is a coil spring 23 which is sealed in the bellows 14 between the sealing ring 15 and the sealing ring 17 or its carrier 20 when said rings are attached to the ends of the unit, said spring being installed under compression so as to tend to expand said bellows.

The sealing unit just described may be installed by merely slipping the same over the shaft 10 when the impeller is removed, and then mounting the impeller in position with the sealing unit under an initial compression to assure that its sealing rings shall be urged under resilient pressure into sealing contact with the surfaces 16 and 18. The tabs 21 on the end of the sealing unit are thereby engaged with the notches 22 on the impeller so that relative rotation between the sealing unit and the impeller is prevented and rotary bearing engagement between the sealing ring 15 and its opposed surface 16 assured. Thereby both sealing rings are maintained in firm sealing contact with their opposed surfaces, the sealing contact being maintained by resilient pressure notwithstanding slight irregularity that may exist in the engaging surfaces or in the alinement of the parts. Sealing contact is thus maintained between the impeller and the adjacent end of the sealing unit by use of relatively soft elastic material while proper sealing contact is also maintained between the stationary surface 16 and the opposed rotatable sealing ring which is made of durable material offering a minimum frictional opposition to relative movement.

It is sometimes desirable to associate with a sealing unit a provision for taking care of outward thrust, as for example when a fan is used with a plain bearing pump, without the entire thrust being sustained by said unit. In accordance with the present invention a thrust bearing ring 24 may be associated with the sealing unit, in concentric relation with respect thereto, and caused to rotate therewith. As shown, said bearing ring 24, which may be of any suitable bearing material such as bronze, has a tubular extension from which extends projections 26 adapted to engage in the recesses 22. Interposed between the projections 21 and 26 are coiled springs 27, retained in position in any suitable way, which hold the bearing face of the ring 24 against the opposed stationary bearing surface 16.

Ring 24 is thereby caused to rotate with the impeller 10, and if a thrust exists toward the outer end of the shaft, this is transmitted to the ring 24 through the tubular extension of impeller 10 after springs 23, 27 and bellows 14 have been sufficiently compressed to take up end play. When the impeller is stationary said resilient elements expand to move the impeller inwardly to the extent permitted by its end play while the springs 27 will continue to hold the ring 24 in contact with the surface 16 and minimize corrosion thereat.

It will be perceived that a sealing unit made in conformity with the present invention may be readily carried in stock and applied by unskilled labor whenever need for replacement arises, as the whole sealing unit may be removed as an entity and a new sealing unit applied as an entity by merely moving the respective units out of and into operative position lengthwise of the shaft when the impeller is removed.

It will also be perceived that when a thrust ring is associated with the sealing unit the ready replaceability of the latter is not interfered with, as said unit may be easily renewed after the bearing ring is removed and then the bearing ring restored to its normal position in telescopic relation to said unit.

While the embodiment of the invention illustrated on the accompanying drawings has been described with considerable particularity, it is to be expressly understood that the invention is not restricted thereto, as the same may be embodied in other forms, as will now be apparent to those skilled in the art, while changes may be made in the materials employed, in details of construction and sizes of parts, etc., without departing from the spirit of this invention. Reference is therefore to be had to the appended claims for a definition of the invention.

What is claimed is:

1. In a seal for a rotary shaft for application between a member rotating with said shaft and a stationary member, a self-contained sealing unit adapted to be mounted between said rotatable and stationary members in telescopic relation with the shaft and including an expansible and collapsible tubular metal wall provided at each end thereof with a sealing ring fixed to and carried by said wall, said unit being provided as a part thereof with one or more projections for engagement with means on said rotatable member when said unit is moved telescopically of said shaft into engagement with said member to interlock said wall with said rotatable member by mere axial movement into engagement therewith.

2. In a seal for a rotary shaft for application between a member rotating with said shaft and a stationary member, a self-contained sealing unit adapted to be mounted between said rotatable and stationary members in telescopic relation with the shaft and including an expansible and collapsible tubular metal wall provided at each end thereof with a sealing ring fixed to and carried by said wall, said unit being provided as a part thereof with means to interlock with said rotatable member upon engagement when said unit is moved telescopically of said shaft into engagement with said member, and a coil spring sealed in said wall between said sealing rings and tending to expand said wall.

3. In a seal for a rotary shaft for application between a member rotating with said shaft and a stationary member, a self-contained sealing unit adapted to be mounted between said rotatable and stationary members in telescopic relation with the shaft and including an expansible and collapsible tubular metal wall provided at one end thereof with an elastic sealing ring and at the other end thereof with a sealing ring of bearing material, said sealing rings being fixed to and carried by said wall, a coil spring sealed in said wall between said sealing rings and normally urging said elastic sealing ring into engagement with said rotatable member and said sealing ring of bearing material into engagement with said stationary member, and means carried by said unit as a part thereof to interlock said unit with said rotatable member upon engagement when said unit is moved telescopically of said shaft into engagement with said member to insure rotation of said wall with said rotatable member.

4. In a seal for a rotary shaft for application between a member rotating with said shaft and a stationary member, a self-contained sealing unit adapted to be mounted between said rotatable and stationary members in telescopic relation with the shaft and including an expansible and collapsible tubular metal wall provided at each end thereof with a sealing ring fixed to and carried by said wall, a bearing ring concentrically arranged with respect to said unit, means whereby said bearing ring and said unit are rotated together, and means for urging said bearing ring into bearing engagement with said stationary member.

5. In a seal for a rotary shaft for application between a member rotating with said shaft and a stationary member, a self-contained sealing unit adapted to be mounted between said rotatable and stationary members in telescopic relation with the shaft and including an expansible and collapsible tubular metal wall provided at each end thereof with a sealing ring fixed to and carried by said wall, a bearing ring concentrically arranged with respect to said unit and having interlocking engagement with said rotatable member, and resilient means reacting between said unit and bearing ring for urging said bearing ring into engagement with said stationary member.

6. In a seal for a rotary shaft for application between a member rotating with said shaft and a stationary member, a self-contained sealing unit adapted to be mounted between said rotatable and stationary members in telescopic relation with the shaft and including an expansible and collapsible tubular metal wall provided at each end thereof with a sealing ring fixed to and carried by said wall, said unit being provided with one or more projections for engagement with means on said rotatable member to interlock said wall with said rotatable member, and a bearing ring arranged concentrically with respect to said unit for bearing engagement with said stationary member, said bearing ring being provided with one or more projections for engagement with said means on the rotatable member whereby said ring rotates with said sealing unit in unitary relationship therewith.

7. In a seal for a rotary shaft for application between a member rotating with said shaft and a stationary member, a self-contained sealing unit adapted to be mounted between said rotatable and stationary members in telescopic relation with the shaft and including an expansible and collapsible tubular metal wall provided at each end thereof with a sealing ring fixed to and carried by said wall, said unit being provided with one or more projections for engagement with means on said rotatable member to interlock said wall with said rotatable member, a bearing ring arranged concentrically with respect to said unit for bearing engagement with said stationary member, said bearing ring being provided with one or more projections for engagement with said means on the rotatable member whereby said ring rotates with said sealing unit in unitary relationship therewith, and resilient means between said projections on said unit and said ring for urging said ring into engagement with said stationary bearing member.

8. In a combined seal and thrust bearing for a rotary shaft for application between a member rotating with said shaft and a stationary member, an expansible and collapsible tubular metal wall adapted to be mounted between said rotatable and stationary members in telescopic relation to said shaft, a sealing ring associated with each end of said wall, means between said rotatable member and said wall and sealing rings for rotating said wall and rings with said rotatable member, a concentrically arranged bearing ring having bearing engagement with said stationary bearing member, and means on said bearing ring cooperating with said last named means whereby said bearing ring is rotatable with said wall and sealing rings in unitary relationship therewith.

9. In a combined seal and thrust bearing for a rotary shaft for application between a member rotating with said shaft and a stationary member, an expansible and collapsible tubular metal wall adapted to be mounted between said rotatable and stationary members in telescopic relation to said shaft, a sealing ring associated with each end of said wall, means between said rotatable member and said wall and sealing rings for rotating said wall and rings with said rotatable member, a concentrically arranged bearing ring having bearing engagement with said stationary bearing member and rotatable with said wall and sealing rings in unitary relationship therewith, and resilient means associated with said bearing ring and sealing rings for normally maintaining said rings in contact with their cooperating surfaces.

10. In a combined seal and thrust bearing for a rotary shaft for application between a member rotating with said shaft and a stationary member, an expansible and collapsible tubular metal wall adapted to be mounted between said rotatable and stationary members in telescopic relation to said shaft, a sealing ring associated with each end of said wall, means between said rotatable member and said wall and sealing rings for rotating said wall and rings with said rotatable member, a concentrically arranged bearing ring having bearing engagement with said stationary bearing member and rotatable with said wall and sealing rings in unitary relationship therewith, resilient means cooperating with said wall for normally urging said sealing rings into engagement with said rotatable and stationary members, and resilient means between said bearing ring and one of said sealing rings for transmitting thrust to said bearing ring.

JOHN E. DUBE.